(12) United States Patent
Truog et al.

(10) Patent No.: US 7,722,938 B2
(45) Date of Patent: *May 25, 2010

(54) DRY PAINT TRANSFER LAMINATE

(75) Inventors: Keith L. Truog, Crown Point, IN (US); Craig W. Potter, Mentor, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/248,047

(22) Filed: Oct. 12, 2005

(65) Prior Publication Data

US 2006/0029765 A1    Feb. 9, 2006

Related U.S. Application Data

(63) Continuation of application No. 10/367,611, filed on Feb. 14, 2003, now abandoned.

(51) Int. Cl.
*B32B 33/00* (2006.01)
*D06N 7/04* (2006.01)

(52) U.S. Cl. .................... 428/40.1; 428/41.5; 428/41.6; 428/42.1; 428/141; 428/904.4; 428/906

(58) Field of Classification Search .............. 428/40.1, 428/40.2, 41.3, 41.5, 41.6, 41.8, 202, 204, 428/354, 906, 41, 42.1, 141, 343, 352, 904.4; 156/230, 234
See application file for complete search history.

(56) References Cited

U.S. PATENT DOCUMENTS

| | | | |
|---|---|---|---|
| 1,365,715 A | 1/1921 | Morrison | |
| 2,746,893 A | 5/1956 | Matthes | 154/46.8 |
| 3,152,030 A | 10/1964 | Sampson | 156/278 |
| 3,301,741 A | 1/1967 | Henrickson et al. | 161/119 |
| 3,314,838 A | 4/1967 | Erwin | 156/71 |
| 3,331,729 A | 7/1967 | Danielson et al. | 161/162 |
| 3,616,192 A | 10/1971 | Sinclair | 161/184 |
| 3,640,791 A | 2/1972 | Rosenheim | 156/230 |
| 3,654,044 A | 4/1972 | Hirota | 161/2 |
| 3,666,516 A | 5/1972 | Dunning | 117/3.4 |
| 3,671,236 A | 6/1972 | Van Beusekom | 96/15 |
| 3,741,786 A | 6/1973 | Torrey | 428/41.9 |
| 3,743,086 A | 7/1973 | Aldrich | |

(Continued)

FOREIGN PATENT DOCUMENTS

DE    2 254 430    3/1974

(Continued)

OTHER PUBLICATIONS

International Search Report, Application No. PCT/US02/40946, dated Aug. 25, 2003.

(Continued)

*Primary Examiner*—Patricia L Nordmeyer
(74) *Attorney, Agent, or Firm*—Jeffrey V Bamber (57) ABSTRACT

This disclosed invention relates to a dry paint transfer laminate, comprising: a dry paint film layer comprising a binder and a pigment, the dry paint film layer having an upper surface and a lower surface; an adhesive layer overlying the upper surface of the dry paint film layer; and a release liner overlying the lower surface of the dry paint film layer.

38 Claims, 1 Drawing Sheet

U.S. PATENT DOCUMENTS

| | | | |
|---|---|---|---|
| 3,804,700 A | 4/1974 | Hoey | 161/160 |
| 3,896,249 A | 7/1975 | Keeling et al. | 428/202 |
| 3,900,644 A | 8/1975 | Sackoff et al. | 428/40 |
| 3,900,645 A | 8/1975 | Morgan | 428/41 |
| 3,907,628 A | 9/1975 | Buske | 156/574 |
| 3,916,046 A | 10/1975 | Youngberg | 428/31 |
| 3,933,702 A | 1/1976 | Caimi et al. | |
| 3,969,181 A | 7/1976 | Seabold | 156/577 |
| 4,026,648 A | 5/1977 | Takahashi | 355/15 |
| 4,037,008 A | 7/1977 | Tugwell | 428/200 |
| 4,054,697 A | 10/1977 | Reed et al. | 428/40 |
| 4,068,033 A | 1/1978 | Meade | 428/201 |
| 4,076,895 A | 2/1978 | Theno | 428/516 |
| 4,094,690 A | 6/1978 | Morton | 106/73.4 |
| 4,118,541 A | 10/1978 | Power et al. | 428/452 |
| 4,151,319 A | 4/1979 | Sackoff et al. | 428/40 |
| 4,175,156 A | 11/1979 | Ikins | 428/336 |
| 4,205,107 A | 5/1980 | Jaschke et al. | 428/58 |
| 4,210,485 A | 7/1980 | Lake | |
| 4,232,077 A | 11/1980 | Meisel | 428/174 |
| 4,235,657 A | 11/1980 | Greenman et al. | 156/234 |
| 4,241,129 A | 12/1980 | Marton et al. | 428/216 |
| 4,248,762 A | 2/1981 | Hornibrook et al. | 260/42.22 |
| 4,248,917 A | 2/1981 | Hornibrook et al. | 428/40 |
| 4,256,794 A | 3/1981 | Meisel | 428/195 |
| 4,258,096 A | 3/1981 | LaMarche | 428/209 |
| 4,262,051 A | 4/1981 | Welz et al. | 428/283 |
| 4,298,647 A | 11/1981 | Cancio et al. | 428/167 |
| 4,369,157 A | 1/1983 | Conner | 264/246 |
| 4,376,151 A | 3/1983 | Parrotta | 428/323 |
| 4,376,159 A | 3/1983 | Spechler | |
| 4,377,050 A | 3/1983 | Renholts | 404/615 |
| 4,451,522 A | 5/1984 | de Vroom | 428/201 |
| 4,499,130 A | 2/1985 | Questel et al. | 428/42 |
| 4,514,457 A | 4/1985 | Sasaki | 428/204 |
| 4,517,044 A | 5/1985 | Arnold | 156/277 |
| 4,524,097 A | 6/1985 | Graham | 428/141 |
| 4,545,090 A | 10/1985 | Redmond | 16/385 |
| 4,550,683 A | 11/1985 | Jones | 118/505 |
| 4,555,441 A | 11/1985 | Rothenberg | 428/284 |
| 4,555,471 A | 11/1985 | Barzynski et al. | |
| 4,556,595 A | 12/1985 | Ochi | 428/143 |
| 4,560,587 A | 12/1985 | Sasaki | 427/152 |
| 4,564,406 A | 1/1986 | Binks | 156/63 |
| 4,598,020 A | 7/1986 | Panush | |
| 4,650,704 A | 3/1987 | Rothenberg | 428/40 |
| 4,661,182 A | 4/1987 | Lerner | 156/94 |
| 4,711,682 A | 12/1987 | Barbe et al. | 156/71 |
| 4,737,225 A | 4/1988 | Waugh et al. | 156/242 |
| 4,759,441 A | 7/1988 | Leurck | 206/373 |
| 4,783,354 A | 11/1988 | Fagan | 428/40 |
| 4,786,537 A | 11/1988 | Sasaki | 428/40 |
| 4,806,184 A | 2/1989 | Shannon | 156/71 |
| 4,818,589 A | 4/1989 | Johnson et al. | 428/201 |
| 4,854,610 A | 8/1989 | Kwiatek | 282/11.5 |
| 4,871,618 A | 10/1989 | Kinneberg et al. | 428/461 |
| 4,888,244 A | 12/1989 | Masubuchi et al. | 428/416 |
| 4,894,274 A | 1/1990 | Graham et al. | 428/151 |
| 4,902,557 A | 2/1990 | Rohrbacher | 428/215 |
| 4,919,994 A | 4/1990 | Incremona et al. | 428/141 |
| 4,999,076 A | 3/1991 | Incremona et al. | 156/241 |
| 5,000,810 A | 3/1991 | Silverstein | 156/238 |
| 5,034,269 A | 7/1991 | Wheeler | 428/317.3 |
| 5,045,569 A | 9/1991 | Delgado | 521/60 |
| 5,073,422 A | 12/1991 | Konno et al. | |
| 5,073,457 A | 12/1991 | Blackwell | 428/484 |
| 5,075,149 A | 12/1991 | Owens et al. | 428/138 |
| 5,084,317 A | 1/1992 | Epple | |
| 5,114,514 A | 5/1992 | Landis | 156/153 |
| 5,134,012 A | 7/1992 | Arakawa et al. | 428/152 |
| 5,135,798 A | 8/1992 | Muschter et al. | 428/202 |
| 5,141,584 A | 8/1992 | Schuh et al. | |
| 5,141,790 A | 8/1992 | Calhoun et al. | 428/40 |
| 5,169,474 A | 12/1992 | Binder | |
| 5,183,696 A | 2/1993 | Sanderson | 428/194 |
| 5,192,612 A | 3/1993 | Otter et al. | 428/355 |
| 5,196,246 A | 3/1993 | Kauss et al. | 428/39 |
| 5,198,301 A | 3/1993 | Hager et al. | 428/355 |
| 5,203,941 A | 4/1993 | Spain et al. | 156/209 |
| 5,215,826 A | 6/1993 | Shimanski et al. | 428/483 |
| 5,229,207 A | 7/1993 | Paquette et al. | 428/355 |
| 5,250,336 A | 10/1993 | Greuse et al. | 428/40 |
| 5,266,372 A | 11/1993 | Arakawa et al. | |
| 5,308,694 A | 5/1994 | Andersson | 428/331 |
| 5,316,843 A | 5/1994 | Kiryu et al. | |
| 5,322,708 A | 6/1994 | Eissele | 427/147 |
| 5,342,666 A | 8/1994 | Ellison et al. | 428/46 |
| 5,346,766 A | 9/1994 | Otter et al. | 428/355 |
| 5,403,432 A | 4/1995 | Burch | 156/577 |
| 5,413,829 A | 5/1995 | Brown et al. | 428/40 |
| 5,430,904 A | 7/1995 | Ono et al. | 15/104.94 |
| 5,441,784 A | 8/1995 | Smith | 428/40 |
| 5,442,832 A | 8/1995 | Tonsager | 15/235.7 |
| 5,451,440 A | 9/1995 | Tynan, Jr. | |
| 5,460,855 A | 10/1995 | Andersson | |
| 5,467,794 A | 11/1995 | Zheng | 135/125 |
| 5,468,532 A | 11/1995 | Ho et al. | 428/40 |
| 5,476,901 A | 12/1995 | Smith et al. | 525/100 |
| 5,478,432 A | 12/1995 | Vester | 156/574 |
| 5,482,182 A | 1/1996 | Thompson et al. | 221/73 |
| 5,487,929 A | 1/1996 | Rusincovitch, Jr. et al. | 428/40 |
| 5,489,359 A | 2/1996 | Yamane | 156/540 |
| 5,490,893 A | 2/1996 | Enlow et al. | 156/230 |
| 5,498,305 A | 3/1996 | Mailloux | |
| 5,506,031 A | 4/1996 | Spain et al. | |
| 5,518,786 A | 5/1996 | Johnson et al. | 428/40.6 |
| 5,523,129 A | 6/1996 | McGeehan-Hatch | 428/13 |
| 5,544,384 A | 8/1996 | Forselius et al. | 15/235.7 |
| 5,571,557 A | 11/1996 | De Bastiani et al. | 427/152 |
| 5,573,865 A | 11/1996 | Steelman et al. | 428/40.9 |
| 5,591,290 A | 1/1997 | Walter et al. | 156/152 |
| 5,591,513 A | 1/1997 | Mahling | |
| 5,595,626 A | 1/1997 | Yokouchi et al. | 156/577 |
| 5,620,772 A | 4/1997 | Taniguchi | 428/143 |
| 5,633,078 A | 5/1997 | Kamiyama | 427/317.3 |
| 5,633,225 A | 5/1997 | Fredj et al. | |
| 5,639,539 A | 6/1997 | DeProspero et al. | 428/195 |
| 5,641,835 A | 6/1997 | Smith et al. | 525/102 |
| 5,643,668 A | 7/1997 | Calhoun et al. | 428/343 |
| 5,658,646 A | 8/1997 | Takano et al. | |
| 5,662,977 A | 9/1997 | Spain et al. | 428/42.1 |
| 5,665,458 A | 9/1997 | Mahn, Jr. | 428/202 |
| 5,670,014 A | 9/1997 | Mendelovich et al. | 156/523 |
| 5,676,787 A | 10/1997 | Rusincovitch et al. | 156/277 |
| 5,681,631 A | 10/1997 | Steelman et al. | 428/42 |
| 5,683,805 A | 11/1997 | Oita et al. | 428/343 |
| 5,686,186 A | 11/1997 | Enlow et al. | |
| 5,707,482 A | 1/1998 | Fusselman | 156/577 |
| 5,707,697 A | 1/1998 | Spain et al. | 428/31 |
| 5,721,086 A | 2/1998 | Emslander et al. | |
| 5,725,712 A | 3/1998 | Spain et al. | 156/230 |
| 5,728,469 A | 3/1998 | Mann et al. | 428/418 |
| 5,741,620 A | 4/1998 | Holmes et al. | |
| 5,750,234 A * | 5/1998 | Johnson et al. | 428/141 |
| 5,750,254 A | 5/1998 | Starkey | 428/343 |
| 5,759,270 A | 6/1998 | Lee | 118/257 |
| 5,773,112 A | 6/1998 | Tachikawa et al. | 428/40.1 |
| 5,785,790 A | 7/1998 | Olsen et al. | 156/239 |
| 5,788,796 A | 8/1998 | Look et al. | 156/277 |
| 5,795,636 A | 8/1998 | Keller et al. | 428/40.1 |
| 5,814,402 A | 9/1998 | Smith | 428/354 |
| 5,851,931 A | 12/1998 | DeRenzo et al. | 442/62 |
| 5,852,121 A | 12/1998 | Steelman et al. | 525/125 |
| 5,853,876 A | 12/1998 | Takano et al. | |

| | | | | | | |
|---|---|---|---|---|---|---|
| 5,866,220 A | 2/1999 | Rusincovitch et al. ...... 428/40.1 | 6,783,816 B2 | 8/2004 | Golub et al. | |
| 5,891,294 A | 4/1999 | Shih et al. ................. 156/307.7 | 6,808,586 B1 | 10/2004 | Steinhardt | |
| 5,897,742 A | 4/1999 | Semmler | 6,824,638 B1 | 11/2004 | Anderson et al. ........... 156/229 | |
| 5,904,968 A | 5/1999 | Langan ....................... 428/41.8 | 6,866,383 B2 | 3/2005 | Naik et al. | |
| 5,906,883 A | 5/1999 | Blanc-Brude ................ 428/178 | 6,872,268 B2 | 3/2005 | David et al. .................... 156/71 | |
| 5,916,643 A | 6/1999 | Spain et al. ..................... 428/31 | 6,875,800 B2 | 4/2005 | Vanier et al. | |
| 5,919,537 A | 7/1999 | Niazy ........................ 428/40.1 | 6,916,532 B2 | 7/2005 | Yanagiuchi ................. 428/354 | |
| 5,939,479 A | 8/1999 | Reaves et al. ................. 524/276 | 6,929,846 B2 | 8/2005 | Kamiyama ................. 428/195 | |
| 5,985,079 A | 11/1999 | Ellison ..................... 156/244.23 | 6,955,124 B2 | 10/2005 | Ciaramitaro et al. ........ 101/485 | |
| 5,989,707 A | 11/1999 | Takizawa et al. ............. 428/343 | 6,984,429 B2 | 1/2006 | Thunhorst et al. ........... 428/41.8 | |
| 6,020,062 A | 2/2000 | Questel et al. ............... 428/354 | 7,141,133 B2 | 11/2006 | Kesti et al. .................. 156/212 | |
| 6,042,678 A * | 3/2000 | Johnson et al. .............. 156/246 | 2001/0006714 A1 | 7/2001 | Bull et al. .................. 428/40.1 | |
| 6,059,002 A | 5/2000 | Katami ....................... 156/541 | 2002/0127361 A1 | 9/2002 | Sandt et al. ................. 428/40.1 | |
| 6,083,616 A | 7/2000 | Dressler ..................... 428/323 | 2002/0142155 A1 | 10/2002 | Steinberg .................... 428/343 | |
| 6,086,995 A | 7/2000 | Smith ........................ 428/352 | 2002/0182955 A1 | 12/2002 | Weglewski et al. | |
| 6,096,396 A | 8/2000 | Patton et al. ................. 428/40.1 | 2002/0197398 A1 | 12/2002 | Scholz et al. ............. 427/207.1 | |
| 6,129,965 A | 10/2000 | Langan ...................... 428/41.8 | 2003/0026932 A1 | 2/2003 | Johnson et al. | |
| 6,153,283 A | 11/2000 | Pierson et al. ............... 428/141 | 2003/0116265 A1 | 6/2003 | Anderson et al. ........... 156/285 | |
| 6,193,918 B1 | 2/2001 | McGuire et al. ............. 264/167 | 2003/0134114 A1 | 7/2003 | Pallotta et al. .............. 428/354 | |
| 6,194,064 B1 | 2/2001 | Keely et al. ................. 428/355 | 2003/0150547 A1 | 8/2003 | Kesti et al. .................. 156/212 | |
| 6,214,453 B1 | 4/2001 | Kano ........................ 428/245 | 2003/0157287 A1 | 8/2003 | Song ........................ 428/40.1 | |
| 6,221,198 B1 | 4/2001 | Gryska et al. ................ 156/325 | 2003/0211334 A1 | 11/2003 | Jones ..................... 428/423.1 | |
| 6,221,485 B1 | 4/2001 | Sanchez et al. .............. 428/352 | 2004/0076788 A1 | 4/2004 | Steinhardt et al. ............. 428/57 | |
| 6,228,486 B1 | 5/2001 | Kittel et al. ................. 428/354 | 2004/0101647 A1 | 5/2004 | Pitzen ....................... 428/40.1 | |
| 6,235,363 B1 | 5/2001 | Bilodeau ................... 428/40.1 | 2004/0126529 A1 | 7/2004 | Squier et al. | |
| 6,248,427 B1 | 6/2001 | Ast | 2004/0159969 A1* | 8/2004 | Truog et al. ................. 264/132 | |
| 6,296,732 B1 | 10/2001 | Enlow et al. ................. 156/209 | 2004/0161564 A1* | 8/2004 | Truog ....................... 428/40.1 | |
| 6,311,399 B1 | 11/2001 | Steelman et al. ............... 30/366 | 2004/0161566 A1* | 8/2004 | Truog et al. ................. 428/40.1 | |
| 6,312,777 B1 | 11/2001 | Smith ....................... 428/41.8 | 2004/0161567 A1 | 8/2004 | Truog et al. | |
| 6,322,874 B1 | 11/2001 | Steelman et al. ............. 428/195 | 2004/0161568 A1* | 8/2004 | Truog et al. ................. 428/40.1 | |
| 6,324,811 B1 | 12/2001 | Gauss et al. .............. 52/746.12 | 2004/0170855 A1 | 9/2004 | Kawabata ................... 428/500 | |
| 6,336,988 B1 | 1/2002 | Enlow et al. ................. 156/238 | 2004/0200564 A1 | 10/2004 | Kinsey et al. ................ 156/230 | |
| 6,349,754 B1* | 2/2002 | Johnson et al. .............. 156/221 | 2004/0247837 A1 | 12/2004 | Enlow et al. | |
| 6,352,769 B1 | 3/2002 | Mori ......................... 428/354 | 2004/0253421 A1* | 12/2004 | Truog et al. ............... 428/195.1 | |
| 6,364,992 B1 | 4/2002 | Nambu et al. ................ 156/277 | 2004/0253422 A1* | 12/2004 | Truog et al. ............... 428/195.1 | |
| 6,376,058 B1 | 4/2002 | Schut et al. | 2004/0253423 A1* | 12/2004 | Truog et al. ............... 428/195.1 | |
| 6,379,791 B1 | 4/2002 | Cernohous et al. ....... 428/355 R | 2005/0003129 A1* | 1/2005 | Truog et al. ................. 428/40.1 | |
| 6,383,613 B1 | 5/2002 | Takeda ...................... 428/195 | 2005/0092420 A1 | 5/2005 | Kinne et al. | |
| 6,394,165 B1 | 5/2002 | Rader | 2005/0175818 A1 | 8/2005 | Kawabata et al. .......... 428/195.1 | |
| 6,399,193 B1 | 6/2002 | Ellison ....................... 428/343 | 2005/0196607 A1 | 9/2005 | Shih et al. | |
| 6,413,630 B1 | 7/2002 | Nakayama .................. 428/344 | 2005/0255271 A1 | 11/2005 | Brimo ....................... 428/40.1 | |
| 6,421,052 B1 | 7/2002 | McGuire .................... 345/441 | 2006/0003114 A1 | 1/2006 | Enlow et al. | |
| 6,432,241 B1 | 8/2002 | Congard et al. .............. 156/157 | 2006/0029765 A1 | 2/2006 | Truog et al. | |
| 6,432,528 B1 | 8/2002 | Faust et al. .................. 428/354 | 2006/0046027 A1 | 3/2006 | Kaminski et al. | |
| 6,447,630 B1 | 9/2002 | Disano et al. | 2006/0046028 A1 | 3/2006 | Kaminski et al. ........... 428/143 | |
| 6,461,422 B1 | 10/2002 | Yang et al. | 2006/0046083 A1 | 3/2006 | Steinhardt et al. ........... 428/480 | |
| 6,461,722 B1 | 10/2002 | Kittel et al. ................. 428/195 | 2006/0051571 A1 | 3/2006 | Steinhardt et al. ........... 428/352 | |
| 6,474,389 B1 | 11/2002 | Steelman et al. ............. 156/382 | 2006/0073318 A1 | 4/2006 | Tuttle et al. ................. 428/500 | |
| 6,475,616 B1 | 11/2002 | Dietz et al. .................. 428/355 | 2006/0088695 A1 | 4/2006 | Coburn ....................... 428/172 | |
| 6,482,488 B1 | 11/2002 | Janssen et al. | 2006/0093776 A1 | 5/2006 | Crum ........................ 428/40.1 | |
| 6,482,638 B1 | 11/2002 | Patil et al. ................. 435/287.2 | 2006/0165979 A1 | 7/2006 | Kinsey et al. | |
| 6,493,918 B1 | 12/2002 | Bell et al. | 2007/0092678 A1 | 4/2007 | Truog et al. | |
| 6,509,075 B1 | 1/2003 | McCurry et al. | 2007/0092679 A1 | 4/2007 | Truog et al. | |
| 6,514,624 B2 | 2/2003 | Takemoto ................... 428/447 | 2007/0098943 A1 | 5/2007 | Truog et al. | |
| 6,520,234 B1 | 2/2003 | Anderson et al. ........... 156/361 | 2007/0154671 A1 | 7/2007 | Shih et al. | |
| 6,541,109 B1 | 4/2003 | Kumar et al. ....................... 3/1 | | | | |
| 6,554,044 B2 | 4/2003 | Paulson et al. | FOREIGN PATENT DOCUMENTS | | | |
| 6,576,327 B2 | 6/2003 | Weissmann et al. | | | | |
| 6,579,601 B2 | 6/2003 | Kollaja et al. ................ 428/212 | DE | 35 43 777 A1 | 6/1987 | |
| 6,613,181 B2 | 9/2003 | Steelman et al. ............. 156/285 | DE | 197 35 958 A1 | 2/1999 | |
| 6,613,411 B2 | 9/2003 | Kollaja et al. ............... 428/40.1 | DE | 198 37 774 A1 | 2/2000 | |
| 6,617,008 B1 | 9/2003 | Kono et al. .................. 428/195 | EP | 0 032 258 | 7/1981 | |
| 6,630,049 B2 | 10/2003 | Hannington et al. ......... 156/289 | EP | 0 103 344 | 3/1984 | |
| 6,645,328 B2 | 11/2003 | Anderson et al. ............. 156/64 | EP | 0 103 407 | 3/1984 | |
| 6,649,003 B1 | 11/2003 | Spain et al. | EP | 0 216 230 | 4/1987 | |
| 6,649,682 B1 | 11/2003 | Breton et al. ................ 524/404 | EP | 0 233 633 | 8/1987 | |
| 6,703,089 B2 | 3/2004 | DeProspero et al. ......... 428/195 | EP | 0 238 301 | 9/1987 | |
| 6,706,131 B2 | 3/2004 | Steelman et al. ............... 156/71 | EP | 0 266 224 | 4/1988 | |
| 6,709,723 B2 | 3/2004 | Roys et al. .................... 428/31 | EP | 0 381 349 | 8/1990 | |
| 6,723,427 B1 | 4/2004 | Johnson et al. .............. 428/343 | EP | 0 384 252 | 8/1990 | |
| 6,740,379 B2 | 5/2004 | Congard et al. | EP | 0 395 814 | 11/1990 | |
| 6,756,095 B2 | 6/2004 | Sandt et al. | EP | 0 473 254 | 3/1992 | |
| 6,773,653 B2 | 8/2004 | Miller et al. | EP | 0 480 892 | 4/1992 | |

| | | |
|---|---|---|
| EP | 0 569 921 B1 | 1/1993 |
| EP | 0 561 086 | 9/1993 |
| EP | 0 569921 | 11/1993 |
| EP | 0 578 957 | 1/1994 |
| EP | 0 619 184 | 10/1994 |
| EP | 0 623 477 A2 | 11/1994 |
| EP | 0 638 019 | 2/1995 |
| EP | 0 658 175 | 6/1995 |
| EP | 0 487 724 | 9/1995 |
| EP | 0 695 629 | 2/1996 |
| EP | 0 803 351 | 10/1997 |
| EP | 0 893 247 | 1/1999 |
| EP | 0 794 522 | 10/1999 |
| EP | 0 992 361 | 4/2000 |
| EP | 0 993 876 A1 | 4/2000 |
| EP | 1 018 533 | 7/2000 |
| EP | 1 023 169 | 8/2000 |
| EP | 1 034 090 | 9/2000 |
| EP | 1 038 665 | 9/2000 |
| EP | 1 047 556 | 11/2000 |
| EP | 1 055 514 A2 | 11/2000 |
| EP | 1053793 | 11/2000 |
| EP | 1 018 533 A2 | 12/2000 |
| EP | 1 093 911 | 4/2001 |
| EP | 1 169 180 | 1/2002 |
| EP | 1 201 422 | 5/2002 |
| EP | 1 203 968 | 5/2002 |
| EP | 1 226 958 A1 | 7/2002 |
| EP | 0 752 498 B1 | 6/2003 |
| EP | 1 318 011 | 6/2003 |
| EP | 1 342 565 | 9/2003 |
| EP | 1 462 423 | 9/2004 |
| EP | 1 518 716 | 3/2005 |
| EP | 1 377 646 | 8/2005 |
| GB | 967405 | 8/1964 |
| GB | 1 232 971 | 5/1971 |
| JP | 49039997 A | 4/1974 |
| JP | 03-080557 A2 | 4/1991 |
| JP | 04-008785 A2 | 1/1992 |
| JP | 05-139095 A | 6/1993 |
| JP | 08/034959 A1 | 2/1996 |
| JP | 08-058033 A2 | 3/1996 |
| JP | 09-041617 A2 | 2/1997 |
| JP | 10/278187 A1 | 1/1999 |
| JP | 11-293123 A2 | 10/1999 |
| JP | 2001-227132 A2 | 8/2001 |
| JP | 2001-295425 A2 | 10/2001 |
| JP | 2001-310953 A2 | 11/2001 |
| JP | 2002-067243 A2 | 3/2002 |
| JP | 2002-113995 A2 | 4/2002 |
| JP | 2005-206724 A | 8/2005 |
| JP | 2005-220337 A | 8/2005 |
| WO | 90/00788 | 1/1990 |
| WO | 92/13712 | 8/1992 |
| WO | 94/03337 | 2/1994 |
| WO | 94/09983 | 5/1994 |
| WO | 95/17312 | 6/1995 |
| WO | 95/18720 | 7/1995 |
| WO | 99/19149 | 4/1999 |
| WO | 99/37479 | 7/1999 |
| WO | 99/64235 | 12/1999 |
| WO | 00/01527 | 1/2000 |
| WO | 00/01527 A1 | 1/2000 |
| WO | 00/50234 | 8/2000 |
| WO | 00/56556 | 9/2000 |
| WO | 01/00411 A1 | 1/2001 |
| WO | 01/79372 A2 | 10/2001 |
| WO | 03/053719 A2 | 7/2003 |
| WO | 03/062341 A2 | 7/2003 |
| WO | 03/095238 A1 | 11/2003 |
| WO | 2004/062903 | 7/2004 |
| WO | 03/066761 | 8/2004 |
| WO | 2004/074007 | 9/2004 |
| WO | 2004/074008 | 9/2004 |
| WO | 2005/007397 | 1/2005 |
| WO | 2005/075591 | 8/2005 |
| WO | 2005/105429 | 11/2005 |

OTHER PUBLICATIONS

International Search Report, Application No. PCT/US02/40945, dated Aug. 25, 2003.
International Search Report, Application No. PCT/US03/15043, dated Oct. 21, 2003.
U.S. Appl. No. 10/457,827, filed Jun. 9, 2003.
U.S. Appl. No. 10/457,806, filed Jun. 9, 2003.
U.S. Appl. No. 10/457,791, filed Jun. 9, 2003.
U.S. Appl. No. 10/457,826, filed Jun. 9, 2003.
U.S. Appl. No. 10/457,790, filed Jun. 9, 2003.
Avery Dennison Corporation et al., PCT Patent Application entitled "Method & System for Digital Media Design," International Application No. PCT/US02/11514, filed Apr. 11, 2002; PCT Response to Invitation to Correct Priority Claim and PCT Response to Invitation to Pay Prescribed Fees Together with Late Payment Fee dated Jul. 24, 2002.
U.S. Appl. No. 10/367,611, filed Feb. 14, 2003.
U.S. Appl. No. 10/779,480, filed Feb. 13, 2004.
U.S. Appl. No. 10/779,526, filed Feb. 13, 2004.
U.S. Appl. No. 10/779,528, filed Feb. 13, 2004.
U.S. Appl. No. 10/779,534, filed Feb. 13, 2004.
U.S. Appl. No. 11/198,661, filed Aug. 5, 2005.
U.S. Appl. No. 11/203,911, filed Aug. 15, 2005.
U.S. Appl. No. 11/204,304, filed Aug. 15, 2005.
U.S. Appl. No. 11/248,047, filed Oct. 12, 2005.
Millikin & Company, "180 Walls", Feb. 16, 2007, Milliken & Company websiete www.180walls.com, home page, pages showing different patterns, and Frequently Asked Questions pages.
Fix-It Club, "How to Hang Wallpaper," http://home.howstuffworks.com, copyright 1998-2007, web pages printed Jan. 24, 2007, pp. 1-13, published on the internet by HowStuffWorks.com, c/o The Convex Group, Atlanta, GA, U.S.A.
Author Unknown, Avery Dennison™ "Find a Solution" Architectural film product information from website www.averydennison.com, copyright 1996-2007, web pages printed Feb. 6, 2007, Avery Dennison Corporation, Pasadena, CA, U.S.A.
Author Unknown, DI-NOC™ Film Planning Guide, pp. 1-32, http://solutions.3m.com/wps/portal/3M/en_US/Graphics/Scotchprint/Solutions/Di-NocFilm/Bulletins/, date of publication unknown, Minnesota Mining and Manufacturing Company (3M), St. Paul, MN, U.S.A.
Author Unknown, DI-NOC™ Film Product Bulletin D1, pp. 1-5, http://solutions.3m.com/wps/portal/3M/en_US/Graphics/Scotchprint/Solutions/Di-NocFilm/Bulletins/, Aug. 2006, Minnesota Mining and Manufacturing Company (3M), St. Paul, MN, U.S.A.
Author Unknown, "Application of 3M™ DI-NOC™ Films, A Guide for Indoor and Outdoor Dry Applications, Instruction Bulletin 5.41", pp. 1-8, www.3m.com/intl/PH/downloads/Dinoc.pdf, Aug. 2006, Minnesota Mining and Manufacturing Company (3M), St. Paul, MN, U.S.A.
Author Unknown, "Instalacion de DI-NOC", pp. 1-27, http://www.pavimentosonline.com/3M/DINOC/index.htm, first date of publication unknown, downloaded Aug. 7, 2006, Minnesota Mining and Manufacturing Company (3M), St. Paul, MN, U.S.A.
U.S. Appl. No. 11/393,506, filed Mar. 30, 2006, Kinsey et al.
U.S. Appl. No. 60/778,832, filed Mar. 3, 2006, Steinhardt et al.
U.S. Appl. No. 60/779,191, filed Mar. 3, Westendorf et al.
U.S. Appl. No. 60/778,996, filed Mar. 3, 2006, Westendorf et al.
U.S. Appl. No. 11/413,543, filed Apr. 28, 2006, Westendorf et al.
U.S. Appl. No. 60/849,052, filed Oct. 3, 2006, Zeik et al.
U.S. Appl. No. 60/849,053, filed Oct. 3, 2006, Zeik et al.
U.S. Appl. No. 11/557,196, filed Nov. 7, 2006, Truog.
List of Co-Pending and/or Related U.S. Applications and Patents, dated Nov. 30, 2007.
U.S. Appl. No. 11/648,452, filed Dec. 28, 2006, Truog et al.
U.S. Appl. No. 60/848,739, filed Oct. 2, 2006, Zeik et al.

All Office Actions to date from U.S. Appl. No. 10/457,827, filed Jun. 9, 2003 (7 documents).
All Office Actions to date from U.S. Appl. No. 10/367,611, filed Feb. 14, 2003 (9 documents).
All Office Actions to date from U.S. Appl. No. 11/557,146, filed Nov. 7, 2006 (2 documents).
All Office Actions to date from U.S. Appl. No. 10/457,791, filed Jun. 9, 2003 (7 documents).
All Office Actions to date from U.S. Appl. No. 10/457,826, filed Jun. 9, 2003 (5 documents).
All Office Actions to date from U.S. Appl. No. 10/457,790, filed Jun. 9, 2003 (6 documents).
All Office Actions to date from U.S. Appl. No. 10/457,806, filed Jun. 9, 2003 (5 documents).

* cited by examiner

DRY PAINT TRANSFER LAMINATE

CROSS-REFERENCE TO RELATED APPLICATION

The present application is a continuation of and claims priority under 35 U.S.C. §120 to commonly assigned U.S. application Ser. No. 10/367,611, filed Feb. 14, 2003, now abandoned, the entire disclosure of which is hereby incorporated herein by reference.

TECHNICAL FIELD

This invention relates to dry paint transfer laminates. These laminates comprise a dry paint film layer, an adhesive layer overlying one side of the dry paint film layer, and a release liner overlying the other side of the dry paint film layer.

BACKGROUND OF THE INVENTION

Conventional painting using liquid paint requires set up steps involving masking off areas not to be painted and the spreading of drop cloths. Conventional painting also requires messy clean up of brushes, rollers, and the like, the problem of spills, exposure to fumes, and delays while the paint dries. When special effects such as faux finishes are desired, additional time and effort is required to apply additional coats.

The present invention provides a solution to these problems. With the present invention it is not necessary to mask off areas that are not to be painted and it is not necessary to use drop cloths. The messy clean up of brushes, rollers, and the like is avoided. Spills and exposure to fumes are avoided. Delays waiting for paint to dry are avoided. Special effects such as faux finishes can be accomplished with a single application.

SUMMARY OF THE INVENTION

This invention relates to a dry paint transfer laminate, comprising: a dry paint film layer comprising a binder and a pigment, the dry paint film layer having an upper surface and a lower surface; an adhesive layer overlying the upper surface of the dry paint film layer; and a release liner overlying the lower surface of the dry paint film layer.

In one embodiment, the release liner comprises: a backing liner which has an upper surface and a lower surface; a first release coating layer overlying the upper surface of the backing liner; and a second release coating layer overlying the lower surface of the backing liner.

In one embodiment, a transparent film layer is positioned between the lower surface of the dry paint film layer and the release liner.

In one embodiment, a printed decorative layer is positioned between the lower surface of the dry paint film layer and the release liner.

In one embodiment, a transparent film layer is positioned between the printed decorative layer and the release liner.

In one embodiment, a second printed decorative layer is positioned between the second dry paint film layer and the release liner.

In one embodiment, a transparent film layer is positioned between the second printed decorative layer and the release liner.

In one embodiment, another release liner overlies the adhesive layer.

This invention relates to a method of coating a substrate, comprising: placing the above-indicated laminate over the substrate with the adhesive layer in contact with the substrate and adhering the laminate to the substrate; and separating the release liner from the laminate leaving the dry paint film layer adhered to the substrate.

This invention relates to a method of making a dry paint transfer laminate, comprising: coating one side of a release liner with a paint film layer and drying or curing the paint film layer, the paint film layer comprising a binder and a pigment, the paint film layer having an upper surface and a lower surface, the release liner having a release surface, the lower surface of the paint film layer being adhered to the release surface of the release liner; and applying an adhesive over the upper surface of the paint film layer.

BRIEF DESCRIPTION OF THE DRAWINGS

In the annexed drawings, like references indicate like parts or features.

DESCRIPTION OF THE PREFERRED EMBODIMENTS

The term "overlies" and cognate terms such as "overlying" and the like, when referring to the relationship of one or a first layer relative to another or a second layer, refers to the fact that the first layer partially or completely lies over the second layer. The first layer overlying the second layer may or may not be in contact with the second layer. For example, one or more additional layers may be positioned between the first layer and the second layer. The term "underlies" and cognate terms such as "underlying" and the like have similar meanings except that the first layer partially or completely lies under, rather than over, the second layer.

The term "dry paint" refers to a paint composition containing one or more volatile components (e.g., organic solvent, water, etc.) that has been applied to a substrate and allowed to dry to the extent that the volatile components have been removed completely or sufficiently to permit the paint to adhere to the substrate and not smear when touched by the end user. The term "volatile" is used herein to refer to materials that are volatile at the drying temperature and atmospheric pressure.

The term "transparent" when referring to the transparent film layer overlying one or more of the dry paint film layers of the inventive dry paint transfer laminate means that the one or more dry paint film layers can be seen through the transparent film layer. The transparent film layer may be translucent.

Figure 1:
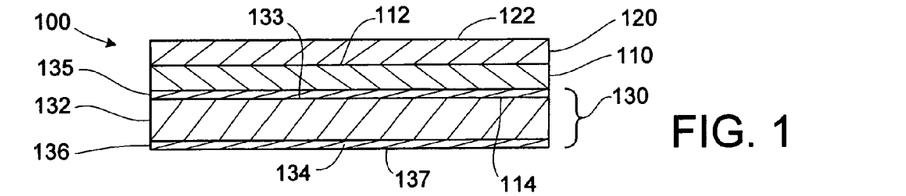
FIG. 1 is a schematic illustration of the side view of a dry paint transfer laminate embodying the present invention in a particular form.

Referring to FIG. 1, the inventive dry paint transfer laminate, in one of its illustrated embodiments, is generally indicated by the reference numeral 100, and comprises: a dry paint film layer 110 which has an upper surface 112 and a lower surface 114; an adhesive layer 120 overlying and adhered to upper surface 112; and a release liner 130 overlying and adhered to the lower surface 114. The release liner 130 comprises: a backing liner 132 which has an upper surface 133 and a lower surface 134; a first release coating layer 135 overlying and adhered to the upper surface 133; and a second release coating layer 136 overlying and adhered to the lower surface 134. The first release layer 135 is positioned between the upper surface 133 of backing liner 132 and the lower surface 114 of dry paint film layer 110, and preferentially adheres to the upper surface 133 of backing liner 132. Thus, when the release liner 130 is peeled away from the dry paint film layer 110, the release coating layer 135 separates from the dry paint film layer 110 and remains adhered to the backing liner 132. The lower surface 137 of release layer 136 is adapted for contacting the upper surface 122 of adhesive layer 120 when the laminate 100 is wound into roll form as illustrated in FIG. 2.

Figure 2:
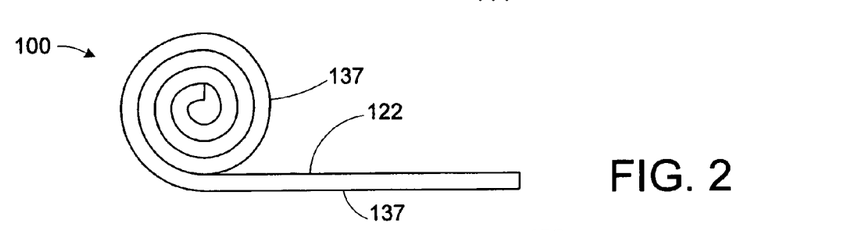
FIG. 2 is a schematic illustration of the dry paint transfer laminate illustrated in FIG. 1, the laminate being partially wound into a roll.

Referring to FIG. 2, the dry paint transfer laminate 100 is wound into roll form with the lower surface 137 of release coating layer 136 in contact with the upper surface 122 of adhesive layer 120. The release coating layer 136 preferentially adheres to backing liner 132. Thus, when the dry paint transfer laminate 100 illustrated in FIG. 2 is unwound, the release coating layer 136 separates from adhesive layer 120 and remains adhered to backing liner 132.

Figure 3:
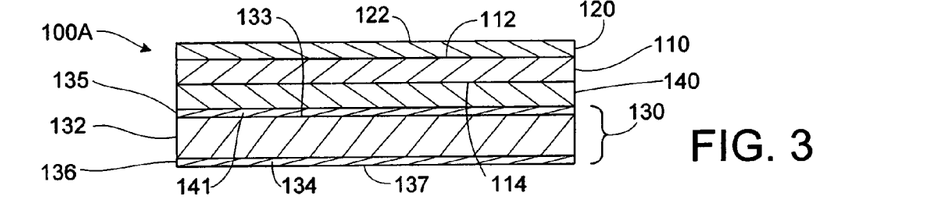
FIG. 3 is a schematic illustration of the side view of another embodiment of the dry paint transfer laminate of the present invention.

The dry paint transfer laminate 100A illustrated in FIG. 3 is identical to the dry paint transfer laminate 100 illustrated in FIG. 1 except that transparent film layer 140 is positioned between dry paint film layer 110 and release coating layer 135. The release coating layer 135 is adhered to transparent film layer 140 on one side and to backing liner 132 on the other side, and is preferentially adhered to backing liner 132. Thus, when the release liner 130 is peeled away from the transparent film layer 140, the release coating layer 135 separates from the transparent film layer 140 and remains adhered to the backing liner 132.

Figure 4:
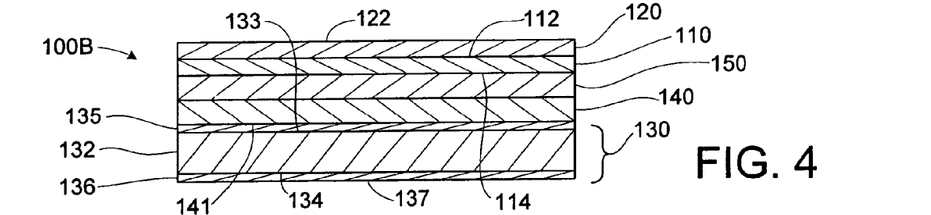
FIG. 4 is a schematic illustration of the side view of still another embodiment of the dry paint transfer laminate of the present invention.

The dry paint transfer laminate 100B illustrated in FIG. 4 is identical to the dry paint transfer laminate 100A illustrated in FIG. 3 except that printed decorative layer 150 is positioned between dry paint film layer 110 and transparent film layer 140.

Figure 5:
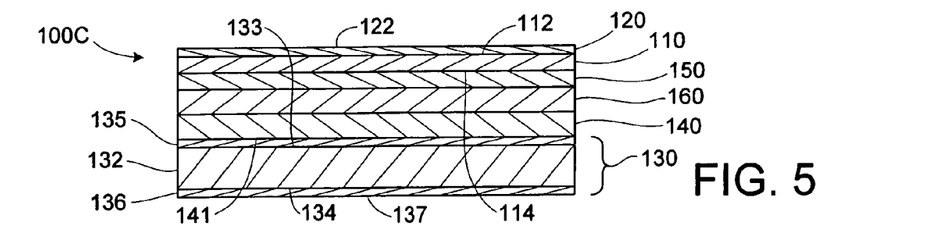
FIG. 5 is a schematic illustration of the side view of still another embodiment of the dry paint transfer laminate of the present invention.

The dry paint transfer laminate 100C illustrated in FIG. 5 is identical to the dry paint transfer laminate 100B illustrated in FIG. 4 except that second printed decorative layer 160 is positioned between printed decorative layer 150 and transparent film layer 140.

Additional printed decorative layers beyond layers 150 and 160 may be used. For example, the inventive laminates may contain up to about 5 or more, and in one embodiment about 3 or about 4, printed decorative layers overlying one another. The printed decorative layers may provide a desired print or design and may be applied using conventional printing methods such as gravure, flexography, silk screen ink jet, etc.

Figure 6:
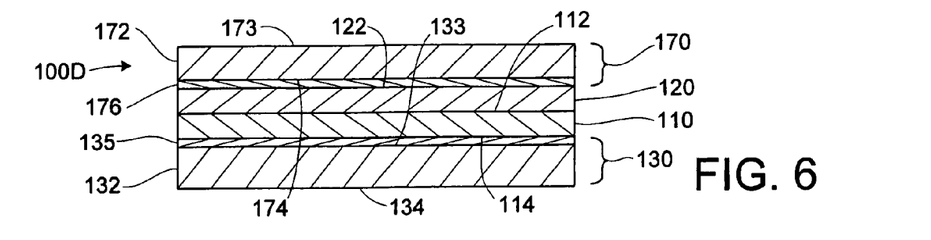
FIG. 6 is a schematic illustration of the side view of still another embodiment of the dry paint transfer laminate of the present invention.

The dry paint transfer laminate 100D illustrated in FIG. 6 is identical to the laminate 100 illustrated in FIG. 1 except that release coating layer 136 is not present, and additional release liner 170 has been added to overlie adhesive layer 120. Release liner 170 comprises: a backing liner 172 which has an upper surface 173 and a lower surface 174; and a release coating layer 176 overlying and adhered to the lower surface 174. The release layer 176 is positioned between the lower surface 174 of backing liner 172 and the upper surface 122 of adhesive layer 120, and preferentially adheres to the lower surface 174 of backing liner 172. Thus, when the release liner 170 is peeled away from the adhesive layer 120, the release coating layer 176 separates from the adhesive layer 120 and remains adhered to the backing liner 172.

The dry paint film layer 110 may have a thickness of about 0.5 to about 1.5 mils, and in one embodiment about 0.5 to about 1.2 mils, and in one embodiment about 0.5 to about 0.9 mil, and in one embodiment about 0.7 mil. The thickness of the adhesive layer 120 may range from about 0.4 to about 1 mil, and in one embodiment about 0.4 to about 0.8 mil, and in one embodiment about 0.4 to about 0.6 mil. The thickness of the backing liner 132 may range from about 0.5 to about 2 mils, and in one embodiment about 0.5 to about 1.5 mils, and in one embodiment about 0.85 to about 1.05 mils. The thickness of the first release coating layer 135 may range from about 0.05 to about 0.3 mil, and in one embodiment about 0.1 to about 0.2 mil. The thickness of the second release coating layer 136 may range from about 0.04 to about 0.2 ml, and in one embodiment about 0.04 to about 0.15 mil, and in one embodiment about 0.04 to about 0.08 mil. The thickness of the transparent film layer 140 may range from about 0.05 to about 0.4 mil, and in one embodiment about 0.05 to about 0.3 mil, and in one embodiment about 0.2 mil. The thickness of the printed decorative layer 150 may range from about 0.02 to about 0.15 mil, and in one embodiment about 0.02 to about 0.08 mils. The thickness of the second printed decorative layer 160 may range from about 0.02 to about 0.15 mil, and in one embodiment about 0.02 to about 0.1 mil. The thickness of the backing liner 172 may range from about 0.5 to about 2 mils, and in one embodiment about 0.5 to about 1.5 mils, and in one embodiment about 0.85 to about 1.05 mils. The thickness of the release coating layer 176 may range from about 0.04 to about 0.2 mil, and in one embodiment about 0.04 to about 0.15 mil, and in one embodiment about 0.04 to about 0.08 mil. Each of the foregoing thicknesses are dry film thicknesses. The laminates 100, 100A, 100B and 100C may have any width and length that is suitable for facilitated use by the end user. For example, the width may range from about 1 to about 200 cm, and in one embodiment 10 to 100 cm, and in one embodiment about 30 to about 40 cm. The length may range from about 10 to about 6500 meters, and in one embodiment about 15 to about 1000 meters. In one embodiment, the length may range from about 19 to about 6500 meters. In one embodiment, the length may range from about 17 to about 20 meters. In one embodiment, the laminate may have a width of about 10 to about 20 cm, and a length of about 10 to about 30 cm. The laminates may be provided in the form of flat sheets or in roll form as illustrated in FIG. 2.

The layers 110, 150 and 160 may comprise one or more binders or resins, and one or more pigments. These layers may be made from liquid coating or paint compositions comprising the one or more binders or resins, the one or more pigments, one or more solvents, and optionally one or more additional additives for controlling properties such as rheological properties and the like.

The binder or resin may be any binder or resin conventionally used in coating or paint formulations. The binder may comprise a thermoplastic or a thermosetting resin. The binder may be a synthetic resin or a natural resin. Examples of useful resins include acrylic resins, vinyl resins, polyester resins, alkyd resins, butadiene resins, styrene resins, phthalic acid or anhydride resins, urethane resins, epoxy resins, and the like. The binder may comprise vinyl and vinylidene polymers or copolymers containing units such as vinyl acetate, vinyl chloride, vinylidene chloride, and the like; hydrocarbon polymers and copolymers containing ethylene or proplene units and oxygenated or halogenated derivatives of ether, butadiene, oxygenated butadiene, isoprene, oxygenated isoprene, butadiene-styrene, butadiene vinyl toluene, isoprene-styrene and the like; polymers or copolymers containing units of acrylic acid, methacrylic acid, their esters, or acrylonitrile; vinylic hydrocarbon monomers reacted with unsaturated materials such as the reaction product of maleic acid or anhydride with styrene; and, broadly, various other resinous rubber-like elastomeric latex polymers and copolymers of ethylenically unsaturated monomers and polymers obtainable in stable aqueous latex form. The binder may comprise a copolymer of vinyl chloride and vinyl acetate. The binder may comprise diphenylmethane diisocyanate, methylene diethyl diisocyanate, isocyanurate, urea-formaldehyde, phenolformaldehyde, phenolic glue, animal hide glues, and the like. Other examples of binders or resins which may be used include fluorine resins, silicone resins, and fibrin resins.

The pigment may be any pigment used in making decorative coatings. These include opacifying pigments, such as titanium dioxide and zinc oxide, as well as tinting pigments such as carbon black, yellow oxides, brown oxides, tan oxides, raw and burnt sienna or umber, chromium oxide green, phthalocyanine green, phthalocyanine blue, ultramarine blue, cadmium pigments, chromium pigments, and the like. The pigments include organic reds such as azo reds, quinacridone red and perylene red as well as organic yellows such as diarylide yellow. Mixed metal oxide pigments may be used. Filler pigments such as clay, silica, talc, mica, woloastonite wood flour, barium sulfate, calcium carbonate, aluminum silicate, and the like can be added as well in conventional amounts traditionally used in coating and paint formulations.

The solvent may either be aqueous or non-aqueous. Aqueous-based solvents include water, and water-based solutions such as water-alcohol mixtures and the like. Non-aqueous solvents include organic-based solvents, such as ketones, esters, aliphatics, aromatics, alcohols, glycols, glycol ethers, etc. These include methylethyl ketone, methylisobutyl ketone, ethyl acetate, white spirits, alkanes, cycloalkanes, benzene, hydrocarbon substituted aromatic compounds (e.g., toluene, the xylenes, etc.), isoparaffinic solvents, and combinations of two or more thereof. The solvent is volatile in nature so that when applied to a substrate, the solvent evaporates leaving behind the binder, pigment and any other additional non-volatile ingredients.

Additional ingredients that may be used include wetting agents; plasticizers; suspension aids; thixotropic agents such as silica; water repellant additives such as polysiloxane compounds; fire retardant additives; biocides; defoamers; flow agents; and the like.

The pigment concentration for the liquid paint or coating composition used to provide the layers 110, 150 and 160 may range from about 10 to about 30% by weight, and in one embodiment about 13 to about 27% by weight. The binder concentration may range from about 20 to about 40% by weight, and in one embodiment about 22 to about 37% by weight. The solvent concentration may range from about 30 to about 70% by weight, and in one embodiment about 40 to about 60% by weight. The additional ingredients such as wetting agents, suspension agents, etc., may be provided at concentrations known in the art, for example, up to about 5% by weight, and in one embodiment from about 0.1 to about 5% by weight. These coating or paint compositions may have a pigment volume concentration (PVC) in the range of about 5 to about 35%, and in one embodiment 10 to about 30%. The liquid paint or coating compositions used for making the film layers 110, 150 and 160 may be mixed using known techniques.

The dry paint film layer 110 may comprise a single coat or multiple coats of paint and is typically in the form of a continuous layer, while the printed decorative layers 150 and 160 may independently be in the form of continuous or discontinuous layers. When multiple coats for the layer 110 are used, each coat may have the same or a different formulation. The layers 150 and/or 160 may have the same color or a different color than the layer 110. The layers 150 and 160 may have the same color, or they may have colors that are different from each other. The layer 110 may be used to provide background color while the layers 150 and/or 160 may be used to provide a pattern or design. For example, the layers 150 and/or 160 may be used to provide a faux finish or a "ragging" or "sponging" look. The layers 150 and/or 160 may be used to provide a desired print or design image (e.g., a flowered design) having one or multiple colors. The designs may be in the form of repeat designs or random non-repeat designs.

The transparent film layer 140 may comprise a single coating layer or multiple coats, and may comprise any of the resin materials described above as being useful for making the dry paint film layer 110. When multiple coats are used, each coat may have the same or a different formulation. Specific examples include polyvinyl chloride, and copolymers of vinyl chloride and acrylic or methacrylic acid. The transparent film layer 140 is primarily distinguishable from the dry paint film layer 110 by the fact that it is transparent or translucent. The transparent film layer 140, in one embodiment, provides enhanced scuff resistance, stain resistance and/or recoatability to the dry paint film layer or layers underlying it. Enhanced recoatability refers to the fact that the presence of the transparent film layer 140 facilitates the subsequent application of another dry paint film layer or printed decorative layer over it, or the application of conventional paint or wall coverings (e.g., wall paper) over it.

The adhesive layer 120 may be a pressure sensitive adhesive layer, a moisture activatable adhesive layer or a heat activatable adhesive layer. The adhesive may comprise any pressure sensitive, moisture activatable or heat activatable adhesive known in the art for use with film substrates. The adhesive layer 120 may be in the form of a continuous or discontinuous layer, and may comprise one or a mixture of two or more adhesives. The adhesive layer may be in the form of a patterned adhesive layer with a relatively strong adhesive in some areas and a relatively weak adhesive in other areas. In one embodiment, the adhesive layer provides initial tack and allows slight movement of the laminate to allow positioning adjustments prior to forming a permanent bond. In one embodiment, the adhesive permits facilitated stripping of the dry paint film layer from a substrate when use of the paint film layer is no longer desired. The adhesive may comprise a rubber based adhesive, acrylic adhesive, vinyl ether adhesive, silicone adhesive, or mixture of two or more thereof. The adhesive may be applied as a hot melt, solvent-based or water based adhesive. Included are adhesive materials described in "Adhesion and Bond", *Encyclopedia of Polymer Science and Engineering*, Vol. 1, pages 476-546, Interscience Publishers, $2^{nd}$ Ed. 1985, the disclosure of which is hereby incorporated by reference. The adhesive materials that are useful may contain as a major constituent an adhesive polymer such as an acrylic-type polymer; block copolymer; natural, reclaimed, or styrene-butadiene rubber; tackified natural or synthetic rubber; a copolymer of ethylene and vinyl acetate; an ethylene-vinyl-acrylic terpolymer; polyisobutylene; poly (vinyl ether); etc. Other materials may be included in the adhesive such as tackifying resins, plasticizers, antioxidants, fillers, waxes, etc.

The adhesive layer 120 may contain one or more pigments to enhance the opacity of the paint film layers overlying it and permit the use of thinner dry paint film layers to achieve desired levels of opacity. Any of the pigments identified above may be used. Specific examples include titanium dioxide and carbon black. The pigment volume concentration may range up to about 10%, and in one embodiment from about 5 to about 10%, and in one embodiment about 2 to about 8%.

The backing liners 132 and 172 may independently comprise paper, polymer film, or a combination thereof. Paper liners are useful because of the wide variety of applications in which they can be employed. Paper is also relatively inexpensive and has desirable properties such as antiblocking, antistatic, dimensional stability, and can potentially be recycled. Any type of paper having sufficient tensile strength to be handled in conventional paper coating and treating apparatus can be employed as the backing liner. Thus, any type of paper can be used depending upon the end use and particular personal preferences. Included among the types of paper which can be used are clay coated paper, glassine, polymer coated paper, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any weight may be employed as a backing liner, paper having weights in the range of from about 30 to about 120 pounds per ream are useful, and papers having weights in the range of from about 60 to about 100 pounds per ream may be used. The term "ream" as used herein equals 3000 square feet.

Alternatively, the backing liners 132 and 172 may independently comprise a polymer film, and examples of polymer films include polyolefin, polyester, and combinations thereof. The polyolefin films may comprise polymer and copolymers of monoolefins having from 2 to about 12 carbon atoms, and in one embodiment from 2 to about 8 carbon atoms, and in one embodiment 2 to about 4 carbon atoms per molecule. Examples of such homopolymers include polyethylene, polypropylene, poly-1-butene, etc. Films prepared from blends of copolymers or blends of copolymers with homopolymers may be used. The films may be extruded in mono or multilayers.

Another type of material which may be used as the backing liners 132 and 172 is a polycoated kraft liner which is basically comprised of a kraft liner that is coated on either one or both sides with a polymer coating. The polymer coating, which can be comprised of high, medium, or low density polyethylene, propylene, polyester, or other similar polymer films, is coated onto the substrate surface to add strength and/or dimensional stability to the liner. The weight of these types of liners ranges from about 30 to about 100 pounds per ream, with about 94 to about 100 pounds per ream being useful. In total, the final backing liner 132 may comprise from about 10% to about 40% polymer and from about 60% to about 90% paper. For two sided coatings, the quantity of polymer may be approximately evenly divided between the top and bottom surface of the paper.

The release coating layer 135 may comprise a single coat of release coating material or multiple coats. When multiple coats are used, each coat may have the same formulation, or different formulations may be used. The release coating layer 135 may comprise any of the above indicated binders or resins which provide sufficient tack or adherence between the release coating layer 135 and either the dry paint film layer 110 (FIGS. 1 and 2) or transparent film layer 140 (FIGS. 3-5) to prevent separation of the release coating layer 135 from film layer 110 or 140 during the making of the dry paint transfer laminate 100, 100A, 100B, 100C or 100D and normal handling of such laminate, and yet have sufficient release properties to provide for facilitated separation between the release coating layer 135 and film layer 110 or 140 when using the laminate. The release coating layer 135 may comprise an alkyd resin and/or a vinyl resin cross linked with a melamine resin. The alkyd resins include resins formed by the condensation of one or more polyhydric alcohols with one or more polybasic acids or anhydrides. The polyhydric alcohols include glycerol and the polybasic acids or anhydrides include phthalic anhydride. Modified alkyds wherein the polybasic acid is substituted in part by a monobasic acid such as acrylic acid or a vegetable oil fatty acid may be used. The vinyl resins that may be used include polyvinyl chloride, polyvinyl acetate, copolymers of vinyl chloride and vinyl acetate, acrylic resins, methacrylic resins, polystyrene resins, and the like. The melamine resins include amino resins made by the condensation of melamine with formaldehyde or a compound capable of providing methylene bridges. The cross linking of the alkyd and/or vinyl resin with the melamine resin typically occurs when the release coating 135 is applied to the backing liner and dried or cured. In one embodiment, the release coating comprises on a solids basis from zero to about 80% by weight, and in one embodiment about 10 to about 30% by weight alkyd resin; from zero to about 80% by weight, and in one embodiment about 10 to about 30% by weight vinyl resin; and from about 10 to about 30% by weight, and in one embodiment about 20 to about 25% by weight melamine resin.

Release coating layer 135 may contain one or more solid particulates that project into the surface 114 of dry paint film layer 110 or the surface 141 of transparent film layer 140 to provide the surfaces 114 or 141 with a matte or flat finish. When particulates are present, the release coating layer 135 may be referred to as a matte release coat or matte release coating layer. The particulates that may be used may be any of the filler pigments described above for use in the paint film layers. Specific examples include talc and aluminum silicate. Particulates with irregular shapes (e.g., platelet shapes) may be used. By controlling the use of these particulates the surface finish of the dry paint film layer or the transparent film layer may be controlled. For example, by using these particulates, the dry paint film layer or the transparent film layer may be provided with a flat or semi-gloss finish. The paint film layer or transparent film layer may be provided with a glossy finish by not using or minimizing the use of these particulates. The weight ratio of particulates to resin or binder may range up to about 1.1:1, and in one embodiment about 0.7:1 to about 1.1:1, and in one embodiment from about 0.7:1 to about 0.9:1, and in one embodiment about 0.9:1 to about 1.1:1.

The release coating layers 136 and 176 may independently comprise any release coating composition known in the art. Silicone release coating compositions may be used. The silicone release coating compositions typically comprise polyorganosiloxanes such as polydimethylsiloxanes. The silicone release coating composition used in this invention may be room temperature cured, thermally cured, or radiation cured. Generally, the room temperature and thermally curable compositions comprise at least one polyorganosiloxane and at least one catalyst (or curing agent) for such polyorganosiloxane(s). These compositions may also contain at least one cure accelerator and/or adhesivity promoter. As is known in the art, some materials have the capability of performing both functions, i.e., the capability of acting as a cure accelerator to increase the rate, reduce the curing temperature, etc., and also as an adhesivity promoter to improve bonding of the silicone composition to the substrate. The use of such dual function additives where appropriate is within the purview of the invention.

In the embodiments illustrated in FIGS. 1-5, the release force required to separate release coating layer 135 from dry paint film layer 110 or transparent film layer 140 is advantageously greater than the release force required to separate release coating layer 136 from adhesive layer 120. In one embodiment, the release force required to separate release coating layer 135 from dry paint film layer 110 or transparent film layer 140 is in the range of about 20 to about 180 grams per two inches (g/2 in), and in one embodiment about 70 to about 90 g/2 in). In one embodiment, the release force required to separate release coating layer 136 from adhesive layer 120 is in the range of about 30 to about 150 g/2 in, and in one embodiment about 30 to about 100 g/2 in, and in one embodiment about 30 to about 70 g/2 in. The test method for determining these release forces involves measuring the force required to separate a two-inch wide release coated liner from an adhesive coated substrate with the release coated liner extending at an angle of 90° relative to the substrate and being pulled at a rate of 300 inches per minute.

In the embodiment illustrated in FIG. 6, the release force required to separate release coating layer 135 from dry paint film layer 110 is advantageously greater than the release force required to separate release coating layer 176 from adhesive layer 120.

Each of the layers 110, 120, 135, 136, 140 and 176 may be applied and dried and/or cured using known techniques. The application techniques include gravure, reverse gravure, offset gravure, roll coating, brushing, knife-over roll, metering rod, reverse roll coating, doctor knife, dipping, die coating, slot die coating, spraying, curtain coating, slide coating, slide curtain coating, extrusion, co-extrusion, flexographic, letter press, rotary screen, flat screen, and the like. In one embodiment, the adhesive layer 120 is a pressure sensitive adhesive layer and it may be applied using transfer lamination. The decorative layers 150 and 160 may be applied using known printing techniques including gravure, flexographic, silk screen, ink jet, etc. The applied layers may be dried and/or cured by exposure to heat or to known forms of ionizing or actinic non-ionizing radiation. Drying or curing temperatures that may be used may range from about 115° C. to about 160° C., and in one embodiment about 140° C. to about 150° C. Useful types of radiation include ultraviolet light and electron beam. The equipment for generating these forms of thermal or radiation drying and/or curing are well known to those skilled in the art.

The dry paint transfer laminate 100 illustrated in FIG. 1 may be made by applying release coating 136 to lower surface 134 of backing liner 132 using one of the foregoing application techniques and then curing the release coating. The coat weight for the release coating layer 136 may be in the range of about 0.1 to about 1 gram per square meter (gsm), and in one embodiment about 0.25 to about 0.35 gsm. Release coating layer 135 is then applied to upper surface 133 of backing liner 132 using one of the above indicated application techniques (e.g, gravure) and then dried or cured. The coat weight for the release coating 135 may range from 20 about 2.5 to about 6.5 gsm, and in one embodiment about 4.5 to about 5.5 gsm. The liquid paint or coating composition for forming dry paint film layer 110 is then applied to the surface of release coating layer 135 using one of the above indicated application techniques (e.g., reverse roll or slot die) and then dried or cured. The coat weight for the dry paint film layer 110 may range from about 20 to about 60 gsm, and in one embodiment about 30 to about 40 gsm. One or more coats may be applied. Pressure sensitive adhesive layer 120 is then applied to upper surface 112 of dry paint film layer 110 using one of the above indicated application techniques (e.g., slot die) and then dried or cured. The pressure sensitive adhesive may be applied using transfer lamination. The coat weight for the pressure sensitive adhesive layer 120 may range from about 10 to about 30 gsm, and in one embodiment about 11 to about 17 gsm. The dry paint transfer laminate 100 may then be wound into roll form as illustrated in FIG. 2 using known techniques.

The dry paint transfer laminate 100A illustrated in FIG. 3 may be made using the same procedure used for making the laminate 100 except that transparent film layer 140 is applied to the surface of release coating layer 135 and then dried or cured prior to the application of the dry paint film layer 110. The dry paint film layer 110 is then applied to the surface of the transparent film layer 140. The transparent film layer 140 may be applied using one of the foregoing application techniques (e.g., gravure). The coat weight for the transparent film layer 140 may range from about 1 to about 5 gsm, and in one embodiment about 2.5 to about 3.5 gsm. One or more coats may be applied.

The dry paint transfer laminate 100B illustrated in FIG. 4 may be made using the same procedure used for making the laminate 100A except that the liquid paint composition for forming the printed decorative layer 150 is applied to the surface of the transparent film layer 140 and then cured prior to the application of the dry paint film layer 110. The dry paint film layer 110 is then applied to the surface of the printed decorative layer 150. The printed decorative layer 150 may be applied using any of the foregoing printing techniques (e.g., gravure, flexographic, silk screen, ink jet, etc.). The coat weight for the printed decorative layer 150 may range from about 0.3 to about 2 gsm, and in one embodiment about 0.3 to about 0.7 gsm.

The dry paint transfer laminate 100C illustrated in FIG. 5 may be made using the same procedure used for making the laminate 100B except that the liquid paint composition for forming the second printed decorative layer 160 is applied to the surface of the transparent film layer 140 and then dried or cured prior to the application of the printed decorative layer 150. The printed decorative layer 150 is then applied over the surface of the second printed decorative layer 160. The second printed decorative layer 160 may be applied using any of the foregoing printing techniques (e.g., gravure, flexographic, silk screen, ink jet, etc.). The coat weight for the second printed decorative layer 160 may range from about 0.3 to about 2 gsm, and in one embodiment about 0.3 to about 0.7 gsm.

The dry paint transfer laminate 100D illustrated in FIG. 6 may be made using the same procedure used for making the laminate 100 illustrated in FIG. 1 except that release liner 170 is adhered to adhesive layer 120 with release coating layer 176 in contact with adhesive layer 120.

The dry paint transfer laminate 100 may be used by unrolling the laminate from the roll illustrated in FIG. 2, and simultaneously applying the laminate to the substrate (e.g., wall) to be covered. The substrate may comprise any flat surface. The flat surface may comprise wall board, plastic sheet, metal sheet, composites, and the like. The substrate may comprise an interior (i.e., indoor) surface or an exterior (i.e., outdoor) surface. The laminate is placed over the substrate with the adhesive layer 120 in contact with the substrate. The release liner 130 is then peeled off leaving the dry paint film layer 110 adhered to the substrate by the adhesive layer 120. An advantage of using this laminate, at least in one embodiment, is that it is possible to overlap part of the applied dry paint film layer with the next adjacent applied dry paint film layer due to the fact that the seams substantially disappear and therefore are not noticeable. This advantage is provided at least in part due to the fact that the dry paint film layer 110 is relatively thin.

The dry paint transfer laminate 100A may be applied to a substrate in the same manner as the laminate 100. When the release liner 130 is peeled off, the dry paint film layer 110, transparent film layer 140, and adhesive layer 120 remain adhered to the substrate with the adhesive layer 120 in contact with the substrate.

The dry paint transfer laminate 100B may be applied to a substrate in the same manner as the laminate 100. When the release liner 130 is peeled off, the dry paint film layer 110, printed decorative layer 150, transparent film layer 140, and adhesive layer 120 remain adhered to the substrate with the adhesive layer 120 in contact with the substrate.

The dry paint transfer laminate 100C may be applied to a substrate in the same manner as the laminate 100. When the release liner 130 is peeled off, the layers 110, 150 and 160, transparent film layer 140, and adhesive layer 120 remain adhered to the substrate with the adhesive layer 120 in contact with the substrate.

The dry paint transfer laminate 100D may be applied to a substrate in the same manner as the laminate 100 except that the laminate is advantageously provided in the form of a flat sheet rather than a roll and the release liner 170 is peeled off before the adhesive layer 120 is adhered to the substrate.

EXAMPLES 1 AND 2

A polyethylene terephthalate film backing liner corresponding to backing liner 132 is coated on one side with a silicone release coating corresponding to second release coating layer 136. The thickness of the release coated liner is 0.92 mil.

A matte release coat corresponding to first release coating layer 135 is applied to the other side of the backing liner using gravure at a coat weight of 6.5-7.75 gsm. The formulation for the matte release coat is as follows: 26% by weight methylisobutyl ketone, 6% by weight isopropanol, 34.8% by weight Lankyd 13-1425 (a product supplied by Akzo Resins identified as an acrylic modified alkyd), 2.6% by weight Elvacite 2042 (a product supplied by Lucite International identified as a polyethyl methacrylate polymer), 30% by weight Microtalc MP 15-38 (a product supplied by Barrett's Minerals identified as a talc extender pigment), 2.5% by weight Cycat 4040 (a product supplied by Cytec identified as paratoluene sulfonic acid) and 8.7% by weight Cymel 303 (a product supplied by Cytec identified as a melamine resin). The matte release coat is dried using forced hot air at a temperature of 149° C.

A transparent film layer corresponding to transparent film layer 140 is applied to the matte release coat using gravure at a coat weight of 2.7-2.9 gsm and dried using forced hot air at a temperature of 120° C. The formulation for the transparent film layer is as follows: 46.7% by weight methyl ethyl ketone, 31.3% by weight toluene, 11% by weight VYNS (a product of Union Carbide identified as a vinyl chloride/vinyl acetate copolymer containing 5-20% by weight vinyl acetate), and 11% by weight Vitel 2200B (a product of Bostic identified as a polyester copolymer).

The following paint compositions are used to form a dry paint film layer corresponding to dry paint film layer 110 on the transparent film layer, one for Example 1 and the other for Example 2. Example 1 has a deep brown tone, while Example 2 has an orange pastel tone. In the following table, all numerical values are in parts by weight.

|  | Example 1 | Example 2 |
|---|---|---|
| Methylethyl ketone | 66.7 | 66.7 |
| Toluene | 33.3 | 33.3 |
| VYHH (product of Union Carbide identified as a vinyl chloride/vinyl acetate copolymer) | 50.05 | 30.55 |
| Edinol 9790 (a product of Cognis identified as a polyester plasticizer) | 24.65 | 15.05 |
| Yellow pigment 42 (iron oxide) | 17.8 | 2.3 |
| Orange pigment 36 (monoazo benzimidazoline) | 2.5 | 0.38 |
| Black 7 (carbon black) | 0.1 | 0.02 |
| White 6 (titanium dioxide) | 4.9 | 51.7 |

The pigment volume ratio for Example 1 is 10%, and for Example 2 it is 27%. The above paint formulations are applied to the transparent film layer using a reversed roller coater and dried at a temperature of 135° C. to drive off the solvents. The dry film thickness of each of the dry paint film layers is 0.7 mil.

A pigmented pressure sensitive adhesive is then applied to the dry paint film layer at a coat weight of 14-20 gsm using transfer lamination to provide an adhesive layer corresponding to pressure sensitive adhesive layer 120. The formulation for the pressure sensitive adhesive is as follows: 70-90% by weight 2-ethylhexyl acrylate, 1-10% by weight acrylic acid, 10-20% by weight methyl acrylate, 3.7% UCD 1106E (a product of Rohm and Haas identified as a titanium dioxide dispersion concentrate), and 0.3% by weight of UCD 1507E (a product of Rohm and Haas identified as a carbon black dispersion concentrate).

EXAMPLE 3

The procedure used for Examples 1 and 2 is repeated except that the following liquid paint composition is used to form the dry paint film layer corresponding to dry paint film layer 110. In the following table, all numerical values are in parts by weight.

| | |
|---|---|
| Methylethyl ketone | 29.6 |
| Toluene | 19.5 |
| Vitel 2200 B | 11.6 |
| Vitel 2650 (product of Bostic identified as a polyester copolymer) | 11.5 |
| R-900 (product of DuPont identified as titanium dioxide) | 27.5 |
| 955-39230 (product of Gibraltar Chemical Works identified as shading black) | 0.2 |
| 99-34520 (product of Gibraltar Chemical Works identified as phthalo blue GS) | 0.1 |
| 955-37470 (product of Gibraltar Chemical Works identified as carbazole violet) | tint |

The foregoing paint composition has a light blue color. The dry film thickness of the dry paint film layer is 0.6-0.8 mil.

EXAMPLE 4

A polyethylene terephthalate film backing liner corresponding to backing liner 132 is coated on one side with a silicone release coating corresponding to second release coating layer 136. The thickness of the release coated liner is 0.92 mil.

A matte release coat corresponding to first release coating layer 135 is applied to the other side of the backing liner using gravure at a coat weight of 4.4-4.6 gsm. The formulation for the matte release coat is as follows: 50.54% by weight methylisobutyl ketone, 7.84% by weight isopropanol, 8.93% by weight Lankyd 13-1425, 10.68% by weight VAGH (product of Union Carbide identified as hydroxy modified polyvinyl chloride/polyvinyl acetate copolymer), 22% by weight Microtalc MP 15-38, 2% by weight Cycat 4040, and 6.8% by weight Cymel 303. The matte release coat is dried using forced hot air at a temperature of 149° C.

A first coat of a transparent film layer corresponding to transparent film layer 140 is applied to the matte release coat using gravure at a coat weight of 1.3-2 gsm and dried using forced hot air at a temperature of 120° C. The dry film thickness is 0.05-0.1 mil. The formulation for this first transparent film layer coat is as follows: 41.5% by weight methyl ethyl ketone, 41.5% by weight methyl isobutyl ketone, and 17% by weight Elvacite 2042 (a product of Lucite International identified as a polymethyl methacrylate).

A second coat of a transparent film layer corresponding to transparent film layer 140 is applied over the first coat of transparent film layer using gravure at a coat weight of 1.0-1.5 gsm and dried using forced hot air at a temperature of 120° C. The dry film thickness is 0.03-0.7 mil. The formulation for this second transparent film layer coat is as follows: 41.5% by weight methyl ethyl ketone, 41.5% by weight methyl isobutyl ketone, and 17% by weight VYHH (a product of Union Carbide identified as a vinyl chloride/vinyl acetate copolymer containing 5-20% by weight vinyl acetate).

A decorative layer corresponding to second printed decorative layer 160 is printed over the second coat of the transparent coating layer at a coat weight of 3.0-3.2 gsm and dried in hot air at a temperature of 120° C. The paint composition used for this decorative layer has the following formulation (all numerical values are in parts by weight):

| | |
|---|---|
| Methylethyl ketone | 42.6 |
| Methyl isobutyl ketone | 38.7 |
| VYHH | 15.86 |
| DP 80110 (product of Gibraltar Chemical Works identified as containing methylethyl ketone, toluene, carbon black and acrylic polymer) | 2.1 |
| DP 36640 (product of Gibraltar Chemical Works identified as containing methyl ethyl ketone, toluene, quinacridone red, and acrylic polymer) | 0.22 |
| 18977 (product of Gibraltar Chemical Works identified as containing methyl ethyl ketone, toluene, R.S. Phthalo Blue, and acrylic polymer) | 0.10 |
| 18980 (product of Gibraltar Chemical Works identified as containing methyl ethyl ketone, toluene, isoindolinone yellow and acrylic polymer) | 0.38 |

A decorative layer corresponding to printed decorative layer 150 is printed over the above indicated decorative layer corresponding to second printed decorative layer 160 at a coat weight of 0.8 gsm and dried in hot air at a temperature of 120° C. The paint composition used for this decorative layer has the following formulation (all numerical values are in parts by weight):

| | |
|---|---|
| Methylethyl ketone | 42.85 |
| Methyl isobutyl ketone | 39.1 |
| VYHH | 16.0 |
| DP 80110 | 1.71 |
| DP 36640 | 0.18 |
| 18977 | 0.18 |

The following paint composition is coated over the above indicated decorative layer corresponding to printed decorative layer 150 at a coat weight of 30-32 gsm and dried in hot air at a temperature of 120° C. to provide a dry paint film layer corresponding to dry paint film layer 110. In the following table, all numerical values are in parts by weight.

| | |
|---|---|
| Methyl ethyl ketone | 34 |
| Toluene | 16.7 |
| VYHH | 18.3 |
| Edinol 9790 | 9 |
| AVI-0301-3 Orange (product of Gibraltar Chemical Works identified as containing methyl ethyl ketone, toluene, diarylide orange, VYHH and Edinol 9790) | 8.9 |
| AVI-0301-5 Magenta (product of Gibraltar Chemical Works identified as containing methyl ethyl ketone, toluene, Metal Azo Red, VYHH and Edinol 9790) | 5.3 |
| AVI-0301-6 Iron Red (product of Gibraltar Chemical Works identified as containing methyl ethyl ketone, toluene, Iron Oxide Red, VYHH and Edinol 9790) | 3.7 |
| AVI-0301-1 TiO$_2$ White (product of Gibraltar Chemical Works identified as containing methyl ethyl ketone, toluene, titanium dioxide, VYHH and Edinol 9790) | 3.52 |
| AVI-0301-2 Carbon Black (product of Gibraltar Chemical Works identified as containing methyl ethyl ketone, toluene, carbon black, VYHH and Edinol 9790) | 0.03 |

A pigmented pressure sensitive adhesive is then applied over the dry paint film layer corresponding to dry paint film layer 110 at a coat weight of 17 gsm using transfer lamination to provide an adhesive layer corresponding to pressure sensitive adhesive layer 120. The formulation for the pressure sensitive adhesive is as follows: 96% by weight of a non-tackified acrylic emulsion containing a crosslinked copolymer of butyl acrylate and ethyl hexyl acrylate, 3.7% by weight UCD 1106E, and 0.3% by weight UCD 1507E.

EXAMPLE 5

A polyethylene terephthalate film backing liner corresponding to backing liner 132 is coated on one side with a silicone release coating corresponding to second release coating layer 136. The thickness of the release coated liner is 0.92 mil.

A matte release coat corresponding to first release coating layer 135 is applied to the other side of the backing liner using gravure at a coat weight of 4.4-4.6 gsm. The matte release coat is dried using forced hot air at a temperature of 149° C. The formulation for the matte release coat is as follows (all numerical values are in parts by weight):

| | |
|---|---|
| Methyl isobutyl ketone | 52.54 |
| Elvacite 4402 (product of Lucite International identified as hydroxy ethyl methacrylate modified acrylic resin) | 20.98 |
| VYNS | 1.35 |

-continued

| | |
|---|---|
| Microtalc 15-38 | 22.85 |
| Byk 451 (product supplied by Byk Chemie identified as blocked acid catalyst) | 2.2 |
| Cymel 303 | 6.38 |

A transparent film layer corresponding to transparent film layer 140 is applied to the matte release coat using a reverse roll coater at a coat weight of 13 gsm and dried using forced hot air at a temperature of 120° C. The dry film thickness is 0.4 mil. The formulation for the transparent film layer coat is as follows (all numerical values are in parts by weight):

| | |
|---|---|
| Rucothane CO-A-5002L (product of Ruco Chemical identified as polyester urethane) | 62.5 |
| Toluene | 18.75 |
| Isopropanol | 18.75 |

A decorative layer corresponding to printed decorative layer 150 is printed over the above indicated transparent film layer at a coat weight of 1 gsm and dried in hot air at a temperature of 120° C. The paint composition used for this decorative layer has the following formulation (all numerical values are in parts by weight):

| | |
|---|---|
| Methyl ethyl ketone | 25.67 |
| Methyl isobutyl ketone | 22.0 |
| VYHH | 9.17 |
| I8980 | 3.5 |
| DP 37251 (product of Gibraltar Chemical Works identified as containing perylene red, methyl ethyl ketone, toluene and acrylic polymer) | 0.99 |
| DP80110 | 1.0 |
| DP39600 (product of Gibraltar Chemical Works identified as containing TiO$_2$, methyl ethyl ketone, toluene and acrylic polymer) | 37.47 |
| I8977 | 0.20 |

The following paint composition is coated over the above indicated decorative layer corresponding to printed decorative layer 150 at a coat weight of 66 gsm and dried in hot air at a temperature of 138° C. to provide a dry paint film layer corresponding to dry paint film layer 110. In the following table, all numerical values are in parts by weight:

| | |
|---|---|
| Methyl isobutyl ketone | 24.11 |
| Toluene | 20.65 |
| VYHH | 11.54 |
| R-900 | 38.4 |
| Acroloid B-72 (product of Rohm and Haas identified as an acrylic resin) | 3.86 |
| I8980 | 2.6 |
| DP37251 | 0.21 |
| DP80110 | 0.40 |

A pressure sensitive adhesive is then applied over the dry paint film layer corresponding to dry paint film layer 110 at a coat weight of 15-20 gsm using transfer lamination to provide an adhesive layer corresponding to pressure sensitive adhesive layer 120. The pressure sensitive adhesive is a non-tackified acrylic emulsion. The formulation for the pressure sensitive adhesive is as follows: 70-90% by weight 2-ethylhexyl acrylate, 1-10% by weight acrylic acid, and 10-20% by weight methyl acrylate.

EXAMPLE 6

A polyethylene terephthalate film backing liner corresponding to backing liner 132 is coated on one side with a silicone release coating corresponding to second release coating layer 136. The thickness of the release coated liner is 0.92 mil.

A matte release coat corresponding to release coating layer 135 is applied to the other side of the backing liner using gravure. The release coat is dried using forced hot air at a temperature of 148.9° C. The matte release coat is applied at a coat weight of 4.0-5.0 gsm. The formulation for the matte release coat is as follows (all numerical values are in parts by weight):

| | |
|---|---|
| Methyl isobutyl ketone | 42.03 |
| Isopropanol | 8.51 |
| Microtalc 15-38 | 23.87 |
| Cymel 303 | 7.36 |
| Cycat 4040 | 1.8 |
| VROH (product supplied by Union Carbide identified as a vinyl chloride/vinyl acetate copolymer with OH functionality) | 16.43 |

A transparent film layer corresponding to transparent film layer 140 is applied over Matte Release Coat No. 2 using a 2 mil byrd bar at a coat weight of 30 gsm and dried using hot air at a temperature of 126.7° C. The formulation for the transparent film layer is as follows (all numerical values are in party by weight):

| | |
|---|---|
| Water | 7.98 |
| N-methyl pyrrolidone | 4.79 |
| Texanol (product of Eastman Chemicals identified as an ester alcohol) | 4.79 |
| BYK 333 (product of Byk Chemie identified as a wetting agent) | 0.4 |
| Vycar 351 (product of Noveon identified as a polyvinyl chloride copolymer emulsion) | 79.81 |
| Antifoam PD-218 (product of Magrabar Chemical identified as an antifoam agent) | 0.32 |
| Rheolate 350 (product of Rheox, Inc. identified as a thickener) | 1.92 |

The following paint composition is coated over the above indicated transparent film at a coat weight of 96 gsm and dried in hot air at a temperature of 126.7° C. to provide a dry paint film layer corresponding to dry paint film layer 110. In the following table, all numerical values are in parts by weight:

| | |
|---|---|
| Water | 18.28 |
| Surfynol CT-324 (product of Air Products identified as a surfactant) | 0.98 |
| R-900 | 32.88 |
| Vycar 460X45 (product of Noveon identified as a vinyl chloride/acrylic copolymer) | 34.72 |
| Vycar 460X46 (product of Noveon identified as a vinyl chloride/acrylic copolymer) | 11.57 |

-continued

| | |
|---|---|
| Antifoam PD-218 | 0.19 |
| Byk 333 | 0.23 |
| Rheolate 350 | 1.2 |

A pressure sensitive adhesive is then applied over the dry paint film layer corresponding to dry paint film layer 110 at a coat weight of 17 gsm using transfer lamination to provide an adhesive layer corresponding to pressure sensitive adhesive layer 120. The formulation for the pressure sensitive adhesive is as follows: 96% by weight of a non-tackified emulsion containing a crosslinked copolymer of butyl acrylate and ethyl hexyl acrylate, 3.7% by weight UCD 1106E, and 0.3% by weight UCD 1507E.

EXAMPLE 7

A polyethylene terephthalate film backing liner corresponding to backing liner 132 is coated on one side with a silicone release coating corresponding to second release coating layer 136. The thickness of the release coated liner is 0.92 mil.

A matte release coat corresponding to first release coating layer 135 is applied to the other side of the backing liner using gravure at a coat weight of 4.4-4.6 gsm. The formulation for the matte release coat is as follows: 50.54% by weight methylisobutyl ketone, 7.84% by weight isopropanol, 8.93% by weight Lankyd 13-1425, 10.68% by weight VAGH (product of Union Carbide identified as hydroxy modified polyvinyl chloride/polyvinyl acetate copolymer), 22% by weight Microtalc MP 15-38, 2% by weight Cycat 4040, and 6.8% by weight Cymel 303. The matte release coat is dried using forced hot air at a temperature of 149° C.

A transparent film layer corresponding to transparent film layer 140 is applied to the matte release coat using gravure at a coat weight of 12-16 gsm and dried using forced hot air at a temperature of 165° C. The dry film thickness is 0.35-0.5 mil. The formulation for this transparent film layer is as follows (all numerical values are in parts by weight)

| | |
|---|---|
| Cyclohexanone | 69.3 |
| Elvacite 2042 | 10.5 |
| Solsperse 17000 (product of Avecia identified as a wetting agent) | 0.1 |
| Tinuvin 234 (product of Ciba identified as a light stabilizer) | 0.6 |
| Kynar 301F (product of Atofina identified as a polyvinyl fluoride homopolymer) | 27.0 |
| N-methyl-2-pyrrolidone | 2.5 |

A decorative layer corresponding to second printed decorative layer 160 is printed over the transparent coating layer at a coat weight of 0.3-1.2 gsm and dried in hot air at a temperature of 105° C. The paint composition used for this decorative layer has the following formulation (all numerical values are in parts by weight):

| | |
|---|---|
| Methylethyl ketone | 36.0 |
| Methyl propyl ketone | 35.1 |
| Kynar 7201 (SL) (product of Atofina identified as a polyvinyl fluoride copolymer) | 10.2 |
| Elvacite 2010 (product of Lucite | 3.4 |

-continued

| | |
|---|---|
| International identified as a polymethyl methacrylate) | |
| Tinuvin 234 | 0.27 |
| DP35740 (product of Gibraltar Chemical Works identified as a buff mixed metal oxide pigment concentrate) | 0.10 |
| DP35820 (product of Gibraltar Chemical Works identified as a brown mixed metal oxide pigment concentrate) | 11.7 |
| DP39040 (product of Gibraltar Chemical Works identified as a black mixed metal oxide pigment concentrate) | 3.3 |

A decorative layer corresponding to printed decorative layer 150 is printed over the above indicated decorative layer corresponding to second printed decorative layer 160 at a coat weight of 0.3-1.2 gsm and dried in hot air at a temperature of 105° C. The paint composition used for this decorative layer has the following formulation (all numerical values are in parts by weight):

| | |
|---|---|
| Methylethyl ketone | 34.0 |
| Methyl propyl ketone | 33.0 |
| Kynar 7201 (SL) | 9.6 |
| Elvacite 2010 | 3.2 |
| Tinuvin 234 | 0.25 |
| DP35740 | 14.4 |
| DP35820 | 5.0 |
| DP39040 | 3.2 |

The following paint composition is coated over the above indicated decorative layer corresponding to printed decorative layer 150 at a coat weight of 6-10 gsm and dried in hot air at a temperature of 105° C. to provide a dry paint film layer corresponding to dry paint film layer 110. In the following table, all numerical values are in parts by weight.

| | |
|---|---|
| Methyl ethyl ketone | 27.6 |
| Methyl propyl ketone | 26.3 |
| Kynar 7201 (SL) | 7.4 |
| Elvacite 2010 | 2.5 |
| Tinuvin 234 | 0.2 |
| DP35740 | 4.1 |
| DP35820 | 7.8 |
| DP39040 | 0.6 |
| DP39600 (product of Gibralter Chemical Works identified as a white titanium dioxide pigment concentrate) | 23.6 |

A pigmented pressure sensitive adhesive is then applied over the dry paint film layer corresponding to dry paint film layer 110 at a coat weight of 17 gsm using transfer lamination to provide an adhesive layer corresponding to pressure sensitive adhesive layer 120. The formulation for the pressure sensitive adhesive is as follows: 96% by weight of a non-tackified acrylic emulsion containing a crosslinked copolymer of butyl acrylate and ethyl hexyl acrylate, 3.7% by weight UCD 1106E, and 0.3% by weight UCD 1507E.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. A dry paint transfer laminate, comprising:
   a dry paint layer which includes a color layer comprising a binder and a pigment, the dry paint layer having an upper surface and a lower surface;
   a dry pressure-sensitive adhesive layer overlying the upper surface of the dry paint film layer; and
   a release liner releasably adhered to the lower surface of the dry paint layer, the release liner having a carrier release coat layer containing particles that project into the releasably adhered dry paint layer for transferring a matte finish to an exposed surface of the dry paint layer when the adhesive layer adheres the laminate to a substrate under the application of pressure and the release liner is peeled away from the dry paint layer.

2. The laminate of claim 1 wherein the dry paint layer includes a transparent layer positioned between the color layer of the dry paint layer and the release liner, and in which the carrier release coat layer is releasably adhered to the transparent layer.

3. The laminate of claim 2 in which the transparent layer comprises an acrylic resinous material and the color layer comprises a plasticized vinyl resinous material.

4. The laminate of claim 3 in which the carrier release coat comprises a thermoset resinous binder bonded to the release liner and in which the particles are dispersed in the binder.

5. The laminate of claim 2 wherein the transparent layer comprises polyvinyl chloride or a copolymer of vinyl chloride and acrylic or methacrylic acid.

6. The laminate of claim 1 wherein the dry paint layer includes a printed decorative layer is positioned between the color layer of the dry paint layer and the release liner.

7. The laminate of claim 6 wherein the dry paint layer includes a transparent layer positioned between the printed decorative layer and the release liner, and in which the carrier release coat layer is releasably adhered to the transparent layer.

8. The laminate of claim 6 wherein the dry paint layer comprises a continuous layer, and the printed decorative layer comprises a pattern or design.

9. The laminate of claim 6 wherein the dry paint layer includes a second printed decorative layer positioned between the printed decorative layer and the release liner.

10. The laminate of claim 9 wherein a transparent layer is positioned between the second printed decorative layer and the release liner.

11. The laminate of claim 9 wherein the dry paint layer comprises a continuous layer; and the printed decorative layer and the second printed decorative layer independently comprise patterns or designs.

12. The laminate of claim 1 wherein another release liner is releasably adhered to the adhesive layer.

13. The laminate of claim 1 wherein the binder comprises a thermoplastic or thermosetting resin.

14. The laminate of claim 1 wherein the binder comprises one or more acrylic resins, vinyl resins, polyester resins, alkyd resins, butadiene resins, styrene resins, phthalic acid or anhydride resins, urethane resins or epoxy resins.

15. The laminate of claim 1 wherein the binder comprises one or more vinyl or vinylidene polymers or copolymers containing units of vinyl acetate, vinyl chloride or vinylidene chloride.

16. The laminate of claim 1 wherein the binder comprises a copolymer of vinyl chloride and vinyl acetate.

17. The laminate of claim 1 wherein the adhesive layer provides initial tack and allows slight movement of the laminate to allow positioning adjustments prior to forming a permanent bond.

18. The laminate of claim 1 wherein the carrier release coat comprises a thermoset resinous binder bonded to the release liner and in which the particles are dispersed in the binder.

19. The laminate of claim 18 wherein the release coating comprises polyethylene terephthalate and the carrier release coat binder comprises a vinyl resin component.

20. The laminate of claim 1 wherein the adhesive comprises a rubber based adhesive, acrylic adhesive, vinyl ether adhesive, silicone adhesive, or mixture of two or more thereof.

21. The laminate of claim 1 wherein the adhesive layer is derived from a hot melt adhesive, solvent based adhesive or water based adhesive.

22. The laminate of claim 1 wherein the adhesive layer comprises an acrylic polymer; a block copolymer; a natural, reclaimed or styrene-butadiene rubber; a tackified natural or synthetic rubber; a copolymer of ethylene and vinyl acetate; an ethylene-vinyl-acrylic terpolymer; a polyisobutylene; or a poly vinyl ether.

23. A dry paint transfer laminate, comprising:
    a dry paint layer comprising a binder and a pigment, the dry paint layer having an upper surface and a lower surface;
    a dry pressure sensitive adhesive layer overlying the upper surface of the dry paint layer; and
    a release liner contacting the lower surface of the dry paint layer, the release liner having a dry matte release coat layer bonded to the release liner and containing particles that contact the dry paint layer and produce a matte (flat or semi-gloss) surface finish on an exposed surface of the dry paint layer when the adhesive layer is pressure-activated to adhere the laminate to a substrate and the release liner is released from its contact with the dry paint layer to expose the matte surface of the dry paint layer.

24. A dry paint transfer laminate, comprising:
    a dry paint layer which includes an opaque color layer comprising a binder and a pigment, and an abrasion-resistant transparent layer overlying the color layer;
    a dry pressure sensitive adhesive layer overlying a surface of the dry paint layer on a side thereof opposite from the transparent layer; and
    a release liner releasably contacting a surface of the dry paint layer opposite from the adhesive layer;
    the release liner having a dry matte release coat layer bonded to the release liner and containing particles that contact the transparent layer to produce a matte (flat or semi-gloss) surface finish on an exposed surface of the transparent layer when pressure is applied to the adhesive layer to adhere the laminate to a substrate after which the release liner is released from its contact with the dry paint layer to expose the matte surface of the transparent layer.

25. A dry paint transfer laminate comprising:
    a matte release liner which includes a flexible polymeric carrier film and a dry matte release coat bonded to the carrier film; a flexible dry paint layer releasably contacting the matte release coat on the release liner; and a dry adhesive layer bonded to the dry paint layer on a side thereof opposite the matte release liner,
    the dry paint layer comprising a pigment dispersed in a polymeric binder,
    the matte release coat having a level of tack that releasably adheres the matte release liner to the dry paint layer to provide support for the laminate when placing the adhesive side of the laminate in contact with a substrate, the adhesive layer comprising a pressure-sensitive adhesive for adhering the dry paint layer to the substrate by application of pressure to the dry paint transfer laminate, the matte release coat containing particles that project into the dry paint layer for transferring a matte finish to an exposed surface of the dry paint layer when the release liner is released from contact with the dry paint layer after the laminate has been adhered to the substrate.

26. The laminate of claim 25 in which the dry paint layer comprises a resinous binder comprising a vinyl acetate/vinyl chloride copolymer or one or more resins selected from the group consisting of acrylic, urethane, polyester, alkyd, butadiene, or vinyl resin.

27. The laminate of claim 25 in which the release coat is selected from the group consisting of a vinyl resin, acrylic resin, polyester resin, alkyd resin, and vinyl chloride/vinyl acetate copolymer.

28. The laminate of claim 25 in which the dry paint layer comprises a pigmented color coat layer and a clear coat layer in which the clear coat layer is in releasable contact with the matte release coat.

29. The laminate of claim 28 in which the clear coat layer comprises an acrylic resin and the color coat layer comprises a plasticized vinyl resin.

30. The laminate of claim 25 in which the matte release coat comprises a polymeric binder in which the particles are dispersed at a solids content greater than 50% particulate material by weight.

31. A multi-layer laminate comprising:
a dry paint layer comprising a resinous binder and a pigment, the dry paint layer having an upper surface and a lower surface;
a dry pressure sensitive adhesive layer overlying the upper surface of the dry paint layer;
a resinous abrasion-resistant dry transparent layer bonded to the lower surface of the dry paint layer, the pigment contained in the dry paint layer forming an opaque color layer between the transparent layer and the pressure-sensitive adhesive layer; and
a release liner in overlying contact with the transparent layer, the release liner comprising a thin, flexible polymeric carrier film and a matte release coat on the carrier film made from a thermoset resinous material containing a dispersed fine particulate solid material and which is bonded to the carrier film and forms a matte surface that transfers a matte surface finish to the transparent layer when the release liner is removed from the paint layer at room temperature.

32. The laminate of claim 31 in which the dry paint layer comprises a resinous binder comprising a vinyl acetate/vinyl chloride copolymer, or one or more resins selected from the group consisting of acrylic, urethane, polyester, alkyd, butadiene, or vinyl resin.

33. The laminate of claim 31 in which the release coat is selected from the group consisting of acrylic resin, polyester resin, alkyd resin, and vinyl chloride/vinyl acetate copolymer.

34. The laminate of claim 31 in which the matte release coat comprises a polymeric binder containing a dispersed particulate material and having a solids content greater than 50% particulate material by weight.

35. The laminate of claim 31 in which the transparent layer comprises an acrylic resin and the opaque color layer comprises a plasticized vinyl resin.

36. The laminate of claim 31 in which the opaque color layer comprises a copolymer of vinyl chloride and vinyl acetate.

37. The laminate of claim 31 wherein the release liner further comprises an adhesive release coat layer on a side of the liner opposite from the matte release coat.

38. A method of coating a substrate, comprising:
placing the laminate of claim 1 over the substrate with the adhesive layer in contact with the substrate and adhering the laminate to the substrate; and
separating the release liner from the laminate leaving the dry paint layer adhered to the substrate.

* * * * *